Patented Sept. 9, 1930

1,775,133

UNITED STATES PATENT OFFICE

ARCHIBALD W. LARSON AND ALBERT K. EPSTEIN, OF CHICAGO, ILLINOIS

MEDICINAL PRODUCT FOR INTRAVENOUS USE

No Drawing.    Application filed December 22, 1925. Serial No. 77,117.

Our invention relates to an improved medicinal preparation.

One of the features of our invention is the production of an improved product containing hexamethylenetetramine and phenylcinchoninic acid for intravenous introduction.

Products containing hexamethylenetetramine and phenylcinchoninic acid have been produced for intravenous introduction, but there have been certain objections thereto because of the presence of formaldehyde and ammonia in the free state and both of which are detrimental to the blood, and are undesirable substances to be introduced intravenously. In prior products the acidity of the phenylcinchoninic acid causes partial decomposition of the hexamethylenetetramine, thereby forming small quantities of ammonia and formaldehyde, which as stated are undesirable for intravenous introduction.

Phenylcinchoninic acid is a chemical substance which is practically insoluble in water and has heretofore been administered by mouth, but its therapeutic effect is enhanced if brought in solution by a suitable solvent which is physiologically harmless and then the product administered intravenously.

Phenylcinchoninic acid has heretofore been used in combination with hexamethylenetetramine, in which it is dissolved, but as already pointed out, as heretofore used the phenylcinchoninic acid caused a partial decomposition of the hexamthylenetetramine, giving certain undesirable qualities when the product is introduced intravenously. There are certain advantages obtained by administering intravenously the phenylcinchoninic acid or its derivative in combination with hexamethylenetetramine, as one enhances the therapeutic value of the other and a greater result is obtained by administering them jointly than each one by itself, but as pointed out above, the phenylcinchoninic acid when brought in contact with the hexamethylenetetramine in solution, partially decomposes the latter, on account of the acidity, producing undesirable constituents. In order to overcome this difficulty we are adding a substance which stabilizes the combination in question and minimizes the decomposition of the hexamethylenetetramine.

To this end we destroy the acidity of the phenylcinchoninic acid by making it neutral by the process of adding to it an equimolecular amount of sodium bicarbonate or any other equivalent alkali, until the acid group is neutralized, thereby forming a sodium salt. When this neutral salt of phenylcinchoninic acid is brought in combination with hexamethylenetetramine, the combination becomes more stable and the decomposition of the hexamethylenetetramine is practically obviated.

It is known that the blood has a certain definite reaction. It is slightly alkaline, and if an acid substance is introduced into the blood stream which will disturb this reaction, complications will set in. We therefore prefer to adjust the solution containing the soluble salt of the above acid to the alkalinity equivalent to that of human blood.

We have referred specifically to phenylcinchoninic acid, but it is to be understood that we are not limited to this and include any other suitable, soluble derivative or other equivalents thereof possessing the phenylcinchoninic acid grouping.

In producing the preferable final product, we produce a sodium salt from the phenylcinchoninic acid by adding to the phenylcinchoninic acid, sodium bicarbonate and a suitable amount of pure distilled water. The resultant sodium salt of the acid is then mixed with the desired amount of hexamethylenetetramine until it goes into solution.

In this way we eliminate the previous objectionable feature of the combination of the phenylcinchoninic acid and hexamethylenetetramine and preventing the formation of the free ammonia and formaldehyde.

However, in order to further improve the product we add to the combination of the neutral salt of phenylcinchoninic acid and hexamethylenetetramine a suitable quantity of sodium salicylate, which will enhance the analgesic, antipyretic and uric acid eliminating value of the above combination.

In illustration, the process is carried out as follows:

500 grams of chemically pure phenylcinchoninic acid are weighed out and introduced into a clean glass flask and to it are added 220 grams of chemically pure sodium bicarbonate. 5000 cubic centimeters of pure distilled water are added and the flask shaken while warming. The introduced ingredients will go into solution and combined with each other. Bubbles and foam appear on account of the liberation of carbon dioxide gas resulting from the interaction of phenylcinchoninic acid and sodium bicarbonate. If so desired, this mixture may be warmed to effect solution. When the phenylcinchoninic acid has been all dissolved, 3000 grams of pure hexamethylenetetramine are introduced and the mixture is shaken or stirred until the hexamethylenetetramine goes in solution. At this stage of the process, we prefer to add 500 grams of sodium salicylate. The added substances increase the volume and at this stage the volume will be about 10,000 c. c.

The solution is filtered, preferably through a suitable filter paper. Glass ampoules of desired size are then filled with the solution and sealed, and we find ampoules of 10 c. c. satisfactory for general use.

It is understood that since the solution is used for intravenous injection, the process of manufacture must be carried out under aseptic conditions and care must be taken not to contaminate the product.

If it is desired to leave out the sodium salicylate from the preparation, then it is necessary to add 300 c. c. of additional water in order to obtain a volume of 10,000 c. c.

What we claim as new and desire to secure by United States Letters Patent is:

1. A medicinal product including phenylcinchoninic acid modified by sodium bicarbonate to destroy the acidity, in solution with hexamethylenetetramine, for intravenous medication.

2. The method of producing a medicinal product including hexamethylenetetramine and phenylcinchoninic acid free of formaldehyde and ammonia for intravenous therapy consisting of adding an alkali to the phenylcinchoninic acid capable of and in sufficient amount to neutralize the acid group therein, and completing the solution by adding hexamethylenetetramine thereto in suitable amounts.

3. A medicinal product for intravenous therapy comprising proportionately 500 grams of chemically pure phenylcinchoninic acid, 220 grams of chemically pure sodium bicarbonate, and 5000 cubic centimeters of pure distilled water, in solution with 3000 grams of pure hexamethylenetetramine.

In witness whereof, we hereunto subscribe our names this 17th day of November, 1925.

ARCHIBALD W. LARSON.
ALBERT K. EPSTEIN.